Dec. 11, 1956  A. A. BRAMMERLO  2,774,024
MULTISPEED INDUCTION MOTOR
Filed Oct. 11, 1955
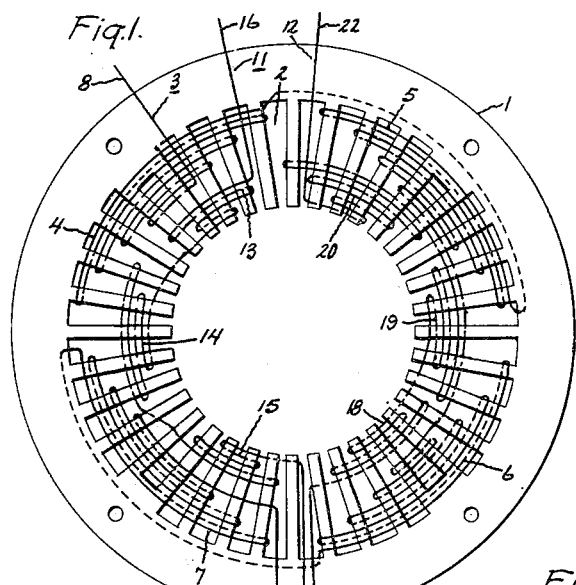
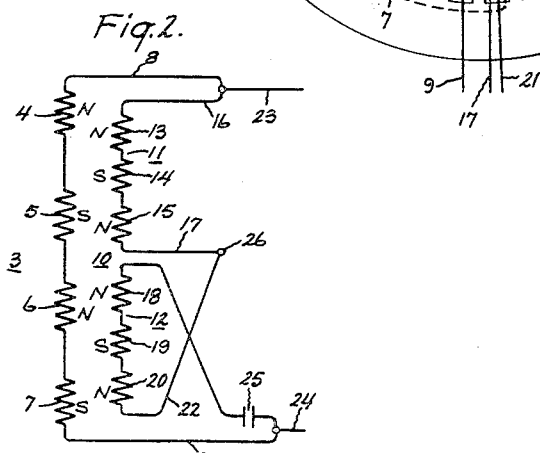
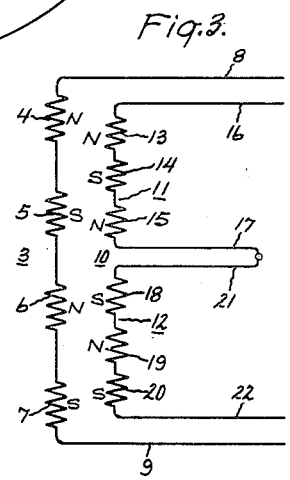
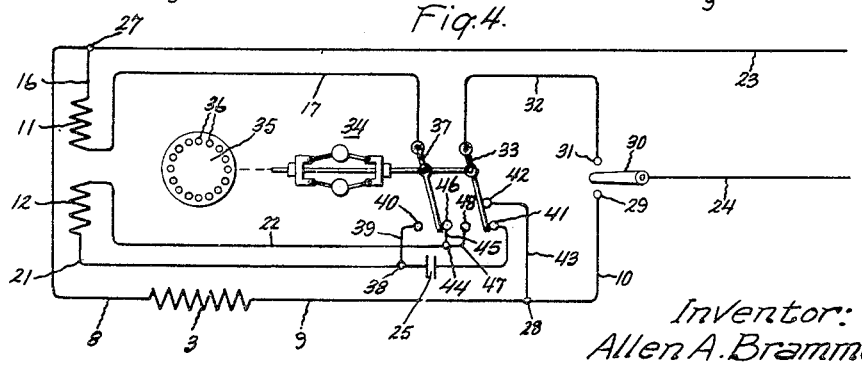
Inventor:
Allen A. Brammerlo,
by
His Attorney.

United States Patent Office 2,774,024
Patented Dec. 11, 1956

2,774,024

MULTISPEED INDUCTION MOTOR

Allen A. Brammerlo, Cortland, Ill., assignor to General Electric Company, a corporation of New York Application October 11, 1955, Serial No. 539,711

6 Claims. (Cl. 318—224)

This invention relates to dynamoelectric machines, and more particularly to multispeed induction-type alternating current electric motors.

There are many applications for induction-type alternating current electric motors where two or more speeds are desired. A common way of achieving different speeds is to provide a different main or running winding for each speed. It has, in the past, generally been found necessary also to provide a special starting winding for starting the motor. This starting winding is commonly connected in parallel with one of the running windings up to a predetermined speed after which the motor will continue to run on the particular running winding selected. The inclusion of an extra winding which is not used during operation has increased the cost of the motor considerably. Thus, efforts have been made in the past to achieve starting by connecting main windings or portions of main windings in parallel until the predetermined speed is reached. However, such arrangements have always found it necessary to relay either on the formation of consequent poles between the actual wound poles or on the cooperation of windings having different numbers of poles. In both cases, the standstill torque and the accelerating torque of the motor suffer to a considerable extent, so that motors of those types are in effect restricted to usages where the starting load is small and little acceleration is required. However, most applications require a motor which comes up to running speed surely and quickly. Accordingly, it is most desirable to provide a motor in which the expense of a special starting winding is eliminated, but which will not have the low torque disadvantages of the arrangements discussed above.

It is, therefore, an object of this invention to provide an improved multispeed induction-type alternating current motor having the advantageous features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broader aspects, this invention provides a multispeed, alternating current induction-type motor having a stator core with at least two main windings arranged thereon. The first of these windings is arranged to form a predetermined number of poles; the second winding is formed of at least two sections, one of the sections being connectable to the other in two different relationships. In the first relationship, the sections are arranged to form a second predetermined number of poles, while in the second relationship the sections form the same predetermined number of poles as the first winding. Means are provided for connecting the windings in parallel with the sections in the second relationship until the motor reaches a predetermined speed. Means are also provided for selecting one of the windings for energization above the predetermined speed; when the second winding is the one selected for energization, the sections are re-connected in the first relationship.

By thus forming the second winding of at least two sections whose relationship can be changed, the number of poles in the two windings can be equated during starting so that a strong starting effect is obtained, while at the same time a special starting winding is made unnecessary by the fact that one of the running windings has been so modified as to perform a double function.

In the drawing:

Figure 1 is a schematic diagram of an actual winding distribution on the stator core of the improved induction motor of this invention;

Figure 2 is a schematic diagram of the windings of this invention when connected in starting relationship;

Figure 3 is a schematic diagram of the winding connections after the predetermined speed of rotation has been reached; and Figure 4 is a schematic diagram of an actual motor circuit incorporating the advantageous features of this invention.

Referring now to the figures of the drawing, an induction-type motor is provided with a stator core 1 formed of a stacked plurality of thin laminations of magnetic material. A plurality of slots 2 are formed in the core 1 to receive the motor windings. A running winding 3 is formed into four poles 4, 5, 6, and 7 and is adapted to be connected across a source of alternating current power through a pair of leads 8 and 9. A second winding, generally indicated at 10, has two sections 11 and 12. Section 11 is wound into three poles 13, 14, and 15 with leads 16 and 17 extending therefrom. Section 12 is similarly formed into three poles 18, 19, and 20 with leads 21 and 22 extending therefrom. It will be seen that connection of the two sections 11 and 12 in series will provide winding 10 with six poles under normal circumstances. This effect may be seen in Figure 3, for instance, where sections 11 and 12 are joined through leads 17 and 21 to provide the six pole arrangement shown. It will, of course, be understood that the polarities shown in the figures are merely illustrative and are, in fact, instantaneous due to the fact that the power source is alternating current. In addition, it will be understood that the particular winding sequence shown in Figure 1 is for illustrative purposes and that other winding sequences may be used to equal advantage. The primary feature is to have one of the windings divided into at least two sections in the manner that winding 10 has been divided into sections 11 and 12, as will be further explained below.

The running of the motor is effected by arranging either of windings 3 or 10, as viewed in Figure 3, across a source of alternating current power to provide high and low speed operation respectively. However, to bring a motor up to full speed from standstill, it is necessary that a rotating field be set up while the motor is stationary in order to induce similar motion in the motor rotor 35 (Figure 4). In order to provide this rotating field at motor standstill, it is necessary to energize two windings which are displaced in space and phase. In order to obtain an amount of torque which is acceptable in most operations, it is generally necessary that the two windings each have the same number of actual poles. Such an effect is achieved in the manner now to be described.

Referring to Figure 2 in particular, windings 3 and 10 are connected in parallel with each other and are both connected across the source of alternating current power through lines 23 and 24. Any desired means, such as capacitor 25, may be provided to effect a satisfactory phase displacement between windings 3 and 10. It will be noted in Figure 3 that when lines 17 and 21 are connected, winding 10 functions as a six pole winding. However, when the connections are reversed, as in Figure 2 where line 22 is connected to line 17 at point 26, the polarity of reversed section 12 is also reversed relative to section 11. Each of poles 18, 19, and 20 will thus be the reverse of what it previously was with respect to poles 13, 14, and 15. In this manner, pole 18 assumes the same polarity as pole 15 and pole 20 assumes the same polarity as pole 13. The physical location of these poles, as shown in Figure 1, then causes poles 15 and 18 to act as a single pole and the same is true for poles 13 and 20. In addition, each of the four poles 13–20, 14, 15–18, and 19 is suitably physically displaced approximately ninety electrical degrees from poles 4, 7, 6, and 5 respectively of winding 3. In this manner, winding 10 is transformed into a four-pole winding offset in space and phase from four-pole winding 3. As a result of these connections, it is possible to start a motor with windings 3 and 10 connected in parallel with each other with both windings being, in effect, four-pole. At a predetermined speed of rotation a switching means, to be described below, may be provided to disconnect the parallel connection of the windings, return winding 10 to its normal six-pole connection, and select either four-pole winding 3 or six-pole winding 10 for energization to operate the motor.

Referring now to Figure 4 of the drawing, there will be described a control circuit embodying the novel concept set forth above. Lines 23 and 24 are adapted to be connected across a source of alternating current power, as set forth in connection with Figure 2. Line 23 is connected to line 8 at point 27 and line 8, in turn, is connected through winding 3, line 9, point 28, and line 10 to a contact 29. A switch arm 30 is provided at the end of line 24 and is selectively engageable with either contact 29 or a contact 31. Contact 31 is connected through a line 32 to a contact arm 33 whose position is controlled by a centrifugal mechanism, generally indicated at 34, which rotates with the rotor 35 of the induction motor. Rotor 35 is schematically illustrated as having squirrel cage bars 36 which are all connected together at their ends (not shown) to form a plurality of closed conducting loops. A second contact arm 37 is movable with contact arm 33 in response to actuation of centrifugal mechanism 34, and is connected to point 27 through line 17, winding section 11, and line 16. The other winding section 12 is connected through line 21, point 38, and line 39 to a contact 40 arranged to be engageable by contact arm 37 when rotor 35 reaches a predetermined speed of rotation so as to actuate mechanism 34. Winding section 12 is also connected through line 21 and capacitor 25 to a contact 41 which is engageable by contact arm 33 below the predetermined speed at which mechanism 34 is actuated. Another contact 42, which is connected to point 28 through a line 43, is engageable by arm 33 at the same time as contact 41. The other end of section 12 is connected through line 22, point 44, and line 45 to contact 46 which is engageable by contact arm 37 in the unactuated postion of centrifugal mechanism 34. Line 22 is also connected at point 44 to a line 47 and a contact 48 which is engageable by contact arm 33 in the actuated position of mechanism 34.

When high speed operation of the motor is desired, contact arm 30 is moved into engagement with contact 29. A first circuit is then completed through line 10, line 9, winding 3, line 8, and line 23. A circuit is also completed through line 10, line 43, contact 42, arm 33, contact 41, capacitor 25, line 21, winding section 12, line 22, line 45, contact 46, arm 37, line 17, winding section 11, and line 16 to line 23. This connection corresponds to the connection shown in Figure 2 of the drawing; in other words, winding 3 is directly connected across the line, and winding 10 is connected across the line with the connections of sections 12 arranged in a predetermined series relationship which is actually reversed from their running arrangement so that winding 10 is in effect, a four-pole winding for starting purposes. With this arrangement, a rotating field is set up to provide adequate standstill and accelerating torque and the motor will start. At the predetermined speed of rotation, mechanism 34 will be actuated and contact arms 33 and 37 will both move to the left as viewed in Figure 4. The only complete circuit will then be through winding 3 in the same manner as before, so that the motor will run at high speed on the four-pole winding 3 alone.

If low speed operation is desired, contact arm 30 is connected to contact 31. A first circuit is then completed through line 32, arm 33, contact 42, line 43, line 9, winding 3, line 8, and line 23. A parallel circuit is completed through contact 41, capacitor 25, line 21, winding section 12, line 22, line 45, contact 46, arm 37, line 17, winding section 11, line 16, and line 23. It will be seen that the starting conections are the same as previously and that the motor will again start as a four-pole motor. At the predetermined speed, mechanism 34 will be actuated and arms 33 and 37 will move to the left. Winding 3 will then be entirely disconnected, and the circuit will be completed through arm 33, contact 48, line 47, line 22, winding section 12, line 21, line 39, contact 40, arm 37, line 17, winding section 11, line 16, and line 23. It will be observed that the connections of section 12 have been reversed relative to section 11; thus, rather than producing the effect of Figure 2, winding sections 11 and 12 produce the effect shown in Figure 3 and so provide a six-pole winding. The motor will then run on winding 10 alone at the lower speed in view of the fact that a six-pole winding is provided.

It will be seen from the foregoing that this invention provides an arrangement whereby a multispeed motor of the type utilizing different windings for different speeds may be provided with high standstill torque and accelerating torque and yet not require a special starting winding. It will, of course, be understood that the invention is not limited to the particular combination of poles shown, that is, while a motor having four- and six-pole windings has been described, the invention is equally applicable to any motor wherein at least two different windings having different numbers of poles are utilized. By the same token, while a control circuit has been illustrated to show the practicality of the inventive concept, it is to be understood that the invention is not limited to any particular control circuit and that any arrangement which provides the desired effect of changing the connections of at least one winding so as to change the actual number of poles of that winding during starting is within the scope of the invention. Also, while a particular physical winding arrangement has been shown, it will be understood that this is for purposes of illustration and to assist in a better understanding of the invention, and that the invention is not limited to any particular winding arrangement except insofar as physical proximity of certain poles is desirable so that they may act as a single pole when it is so desired and insofar as the location of the poles contributes to displacement between poles of the two windings during the starting connection.

While the invention has been explained by describing the particular embodiment thereof, it will be apparent that improvements and modifications may be made without departing from the scope of the invention as defined in the appended claims.

What I claim as new and desire to secure by Letters Patent of the United States is:

1. A multispeed alternating current induction-type motor having a stator core, at least two main windings arranged on said core, the first of said windings being arranged to form a predetermined number of poles, the second of said windings being formed of at least two sections, one of said sections being connectable to the other of said sections in two different relationships, said sections being arranged to form a second predetermined number of poles in the first of said relationships and to form the same predetermined number of poles as said first winding in the second of said relationships, said poles of said second winding being respectively physically displaced from the poles of said first winding when said sections are connected in the second of said relationship, means for connecting said windings in parallel and said sections in said second relationship up to a predetermined speed of rotation of said motor, and means for selecting one of said windings for energization above said predetermined speed, said sections being connected in said first relationship when said second winding is selected.

2. A multispeed alternating current induction-type motor having a stator core, at least two main windings arranged on said core, the first of said windings being arranged to form a predetermined number of poles, the second of said windings being formed of at least two serially connected sections, one of said sections being reversibly connectable relative to the other of said sections thereby to provide two different relationships of said sections, said sections being arranged to form a second predetermined number of poles in the first of said relationships and to form the same predetermined number of poles as said first winding in the second of said relationships, said poles of said second winding being respectively physically displaced from the poles of said first winding when said sections are connected in the second of said relationships, means for connecting said windings in parallel and said sections in said second relationship up to a predetermined speed of rotation of said motor, and means for selecting one of said windings for energization above said predetermined speed, said sections being connected in said first relationship when said second winding is selected.

3. A multispeed alternating current induction-type motor having a stator core, at least two main windings arranged on said core, the first of said windings being arranged to form a predetermined number of poles, the second of said windings being formed of at least two serially connected sections, one of said sections being reversibly connectable relative to the other of said sections thereby to provide two different relationships of said sections, said sections being arranged to form a second higher predetermined number of poles in the first of said relationships, each of said sections being arranged on said core to form half of said second predetermined number of poles, at least two of the poles of said one section being arranged to cooperate respectively with at least two of the poles of said other section to form single poles respectively when said sections are connected in the second of said relationships thereby to decrease the number of poles of said second winding to the predetermined number of poles of said first winding, said poles of said second winding being respectively physically displaced from the poles of said first winding when said sections are connected in the second of said relationships, means for connecting said windings in parallel and said sections in said second relationship up to a predetermined speed of rotation of said motor, and means for selecting one of said windings for energization above said predetermined speed, said sections being connected in said first relationship when said second winding is selected.

4. A two-speed alternating current induction-type motor having a stator core, two main windings arranged on said core, the first of said windings being arranged to form four poles, the second of said windings being formed of two serially connected sections, one of said sections being reversibly connectable relative to the other of said sections thereby to provide two different relationships of said sections, said sections being arranged to form six poles in the first of said relationships, each of said sections being arranged on said core to form three of said six poles, two of the poles of said one section being arranged to cooperate respectively with two of the poles of said other section to form single poles respectively when said sections are connected in the second of said relationships thereby to decrease the number of poles of said second winding to four, said poles of said second winding being respectively displaced approximately ninety electrical degrees from the poles of said first winding when said sections are connected in the second of said relationships, means for connecting said windings in parallel and said sections in said second relationship up to a predetermined speed of rotation of the motor, and means for selecting one of said windings for energization above said predetermined speed, said sections being connected in said first relationship when said second winding is selected.

5. A circuit for a two-speed alternating current induction-type motor having a stator comprising a first main winding formed into a predetermined number of poles, a second main winding formed of two sections, a speed responsive mechanism, contact means operable by said mechanism at a predetermined speed from a first operative position to a second operative position, said first winding being adapted to be connected directly across a source of alternating current power upon selection of the higher speed, said second winding being adapted to be connected across the source through said contact means with said sections in a predetermined series relation below said predetermined speed upon selection of the high speed, said contact means being arranged to disconnect said second winding upon actuation by said mechanism when the higher speed has been selected, said first winding being adapted to be connected across the source through said contact means below said predetermined speed upon selection of the lower speed, said contact means being arranged to disconnect said first winding upon actuation by said mechanism when the lower speed has been selected, said second winding being adapted to be connected across the source with said sections in said predetermined relationship through said contact means below said predetermined speed upon selection of the lower speed, said second winding being adapted to be connected across the source with one of said sections having a reversed connection to the other of said sections through said contact means above said predetermined speed when the lower speed has been selected, said sections being arranged on said stator to form the same predetermined number of poles as said first winding when connected in said predetermined relationship and to form a higher number of poles when arranged in said reversed connection, the poles of said second winding being respectively physically displaced from the poles of said first winding when said sections are connected in said predetermined relationship.

6. A circuit for a two-speed alternating current induction-type motor having a stator comprising first and second main windings, said second main winding being formed of two sections, a speed responsive mechanism, a pair of contact arms operable by said mechanism at a predetermined speed from a first operative position to a second operative position, said first winding being adapted to be connected directly across a source of alternating current power upon selection of the higher speed, said second winding being adapted to be connected across the source with said sections in a predetermined series relationship through said pair of contact arms below said predetermined speed upon selection of the higher speed, said contact arms being arranged to disconnect said second winding upon operation thereof by said mechanism when the higher speed has been selected, said first winding being adapted to be connected across the source through one of said contact arms below said predetermined speed upon selection of a lower speed, said one contact arm being arranged to disconnect said first winding upon operation of said mechanism when the lower speed has been selected, said second winding being adapted to be connected across the source with said sections in said predetermined relationship through said pair of contact arms below said predetermined speed upon selection of the lower speed, said second winding being adapted to be connected across the source with one of said sections having a reversed connection to the other of said sections through said contact arms above said predetermined speed when the lower speed has been selected, said sections being arranged on said stator to form four poles when connected in said predetermined relationship and to form six poles when connected in said reversed relationship, said first winding being arranged on said stator to form four poles, the poles of said second winding being respectively displaced approximately ninety electrical degrees from the poles of said first winding when said sections are connected in said predetermined relationship.

No references cited.